United States Patent [19]
Eastman et al.

[11] 3,933,771

[45] Jan. 20, 1976

[54] COMPOSITION OF AND METHOD OF OBTAINING SMALL PARTICLE SIZE POLYMERS AND COPOLYMERS OF VINYL CHLORIDE HAVING A FUSED SURFACE

[75] Inventors: David W. Eastman, Angola; Anthony L. Lemper, Tonawanda; Victor A. Pattison, Clarence Center; George C. Hopkins, Clarence; Henry Kahn, Williamsville, all of N.Y.; Jack L. Nickels, Willingboro, N.J.

[73] Assignee: Hooker Chemicals & Plastics Corporation, Niagara Falls, N.Y.

[22] Filed: June 24, 1974

[21] Appl. No.: 482,111

Related U.S. Application Data

[63] Continuation-in-part of Ser. No. 379,886, July 16, 1973, abandoned, which is a continuation of Ser. No. 172,546, Aug. 17, 1971, abandoned.

[52] U.S. Cl...... 260/87.1; 204/159.22; 260/31.8 M; 260/87.5 R; 260/87.7; 260/92.8 R
[51] Int. Cl.² .................. C08F 3/30; C08F 15/06
[58] Field of Search............. 260/92.8 R, 87.5, 87.1

[56] References Cited
UNITED STATES PATENTS

| | | | |
|---|---|---|---|
| 3,151,103 | 9/1964 | Heckmaier et al. | 260/92.8 R |
| 3,522,227 | 7/1970 | Thomas | 260/92.8 R |
| 3,560,460 | 2/1971 | Gilbert | 260/92.8 R |
| 3,562,237 | 2/1971 | Thomas | 260/92.8 R |
| 3,583,956 | 6/1971 | Pointer et al. | 260/86.3 |
| 3,652,525 | 3/1972 | Nakamura et al. | 260/92.8 R |
| 3,683,051 | 8/1972 | Chatelain | 260/92.8 R |
| 3,687,923 | 8/1972 | Thomas | 260/92.8 R |
| 3,725,367 | 4/1973 | Kemp | 260/80.81 |

Primary Examiner—Harry Wong, Jr.
Attorney, Agent, or Firm—Peter F. Casella; James F. Mudd; David A. Stein

[57] ABSTRACT

Polyvinyl chloride and polyvinyl chloride containing up to 20 percent of a comonomer can be obtained in the form of small particle size spherical glassy surface particles by a process of bulk polymerization of monomer or monomers comprising two stage polymerization wherein high shear agitation is used during the first stage and low shear agitation is used in the second stage. To obtain a reduction in particle size, the polymerization in the first stage is conducted in contact with at least one of (A) an additive comprising an organic or inorganic, inert, fine particle size material solid at least at reaction temperatures, and insoluble in said monomer or monomers used, and (B) a cationic, anionic, or non-ionic surface active agent. A portion of the polymerization in a second stage reaction is conducted at temperature and pressure sufficient to render the surface of the individual particles or agglomerates glassy and fused. The resulting polymers and copolymers produced have superior plastisol viscosity stability and fusion characteristics and excellent powder flow properties as compared to those of the prior art.

8 Claims, No Drawings

3,933,771

COMPOSITION OF AND METHOD OF OBTAINING SMALL PARTICLE SIZE POLYMERS AND COPOLYMERS OF VINYL CHLORIDE HAVING A FUSED SURFACE

REFERENCE TO PRIOR APPLICATIONS

This is a continuation-in-part of copending application Ser. No. 379,886, filed July 16, 1973, now abandoned which is a continuation of application Ser. No. 172,546, filed August 17, 1971, now abandoned.

BACKGROUND OF THE INVENTION

1. Field of the Invention

This invention relates to the preparation of homopolymers and copolymers of vinyl chloride having reduced grain size and reduced porosity which are resistant to the swelling effect at room temperature of primary plasticizers for high molecular weight polyvinyl chloride.

Such fine grain homopolymers and copolymers can be obtained in the 20 micron to 50 micron average grain size by the process of the invention which have reduced susceptibility to solvation by primary plasticizers at ambient temperatures and are useful as extender resins in the preparation of plastisols and organosols. The polymers of the invention can be used in applications where previously bulk polymerized polymers were unsuited because of their excessive grain size and wide grain size distribution in addition to high plasticizer absorptivity at room temperature. Prior art bulk polymerization methods produce polymers having average grain sizes in the range of about 80 to about 150 microns. More costly suspension polymerization processes are utilized to produce fine grain size extender polymers having low primary plasticizer absorptivity.

2. Description of the Prior Art

Polyvinyl chloride is classically produced by bulk or mass polymerization methods which means polymerization or copolymerization in the absence of solvents and diluents. The polymer is produced in particulate form having irregular shape which may vary from minute specks to irregular non-globular masses. In British Pat. No. 1,047,489 and U.S. Pat. No. 3,522,227, both of which are hereby incorporated by reference, there are described a method of polymerization in mass in two steps which produces an improvement in regularity of granular size and shape. The process is more controllable and the product more uniform than can be obtained by other methods of bulk polymerization. In this process, the monomer is polymerized in a first stage to about 7 to about 15 percent conversion, preferably about 8 to about 10 percent conversion in a reactor called a prepolymerizer in which provision is made for high speed, high shear agitation. At the end of the first stage of polymerization, the mass is transferred to a second reactor and further polymerized in this second stage reactor in which provision is made for slow speed agitation to an appropriate end point (70 to 85 percent conversion in many cases).

In copending U.S. application Ser. No. 169,838, filed Aug. 6, 1971, a process is described which relates to the production of homopolymers and copolymers of vinyl chloride by a two stage polymerization method which produces a further reduction in particle size by a method involving contacting the monomer or monomers in the first stage of polymerization with an organic or inorganic, inert, particulate material solid at least at reaction temperature, a surface active agent, or a combination thereof. Examples of such solid inert materials are silicon dioxide, a hydrophobic coated silicon dioxide, solid particles obtained by emulsion polymerization of vinyl chloride, calcium carbonate, and calcium stearate. The particle size of the polymer is substantially reduced over the product of the process disclosed in U.S. 3,522,227, but nevertheless, still retains a high degree of porosity to plasticizers at room temperature. Incorporation of substantial amounts of these polymer particles as an extender resin in a plastisol can result in a rapid rise in viscosity upon ageing the plastisol at room temperature.

The polymers produced by the method of this invention are characterized by having a small particle size as obtained by the method described in copending U.S. Ser. No. 169,838, but additionally have the characteristics of lower fusion temperature and remaining substantially unsolvated when placed in contact with primary type plasticizers for vinyl chloride resins at room temperature as judged by viscosity stability tests on plastisols containing the polymer particles of the invention.

SUMMARY OF THE INVENTION

This invention relates to a method of obtaining a small particle size homopolymer or copolymer of vinyl chloride having a fused, glassy shell on the particles or agglomerates by bulk polymerization using high speed, high shear agitation during a first stage in which about 3 to about 15 percent of the monomer or monomers are converted and polymerization in a second stage using low speed, low shear agitation and increased heat and pressure for a portion of the remainder of the reaction. During the first stage polymerization, the monomer or monomers are contacted with at least one of a surface active agent or a small particle size organic or inorganic inert material both solid and insoluble in the monomer or monomers at reaction temperatures. In other words the invention is directed to a process for preparing vinyl chloride polymer or copolymer particles having a fused, glassy surface which comprises:

1. polymerizing a monomer or monomers in a first stage at a temperature of about 30 to about 80°C and in contact with at least one of an additive selected from the group consisting of:
   A. an inorganic or organic, inert, fine particle size material, solid at least at reaction temperature and insoluble in said monomer or monomers, said material having an average particle size in the range of about 0.001 to about 50 microns and said material being present in the amount of 0.001 to 5 percent based upon said monomer or monomers present in said first stage, and
   B. a surface active agent in an amount of 0.01 to 5 percent by weight based upon the monomer or monomers present in said first stage during which the reaction mixture is subjected to high speed agitation until about 3 percent to about 15 percent by weight of said monomer or monomers have been converted to polymer particles, and
2. continuing the preparation of polymer particles by polymerization in a second stage during which said reaction mixture is subjected to low speed agitation at a temperature of about 30 to about 80 degrees centigrade and completing the reaction by increasing the temperature of the reaction mixture to about 60 to about 95 degrees centigrade, the increase in temperature being in the range of about 10 to about 65 degrees centigrade, so that at least 10 to about 50 percent of monomer or monomers present in said second stage are polymerized to provide on the surface of the polymer particles a low molecular weight, glassy, fused coating of polymer. A reduction in particle size of the product can in this way be obtained as compared to products obtained by methods disclosed in U.S. Pat. No. 3,522,227.

DESCRIPTION OF THE PREFERRED EMBODIMENTS

The method of the invention contemplates addition of increased heat and pressure in the second stage bulk polymerization of vinyl chloride polymers or copolymers at a point during the conversion of the monomer or monomers so that at least 10 to about 50 percent of monomer or monomers, preferably at least about 20 to about 30 percent of a total of about 85 percent final monomer or monomers converted is polymerized to provide on the surface of the particles a low molecular weight, glassy, fused, coating of polymer which renders the particles less susceptible to solvation when in contact at room temperature with a primary plasticizer for polyvinyl chloride or polyvinyl chloride copolymers. The polymers also fuse at a low temperature. During the second stage of polymerization, the temperature of the reactor contents is raised from about 30 to about 80° centigrade to about 60° to about 95° centigrade and the pressure is raised from about 80 to about 120 pounds per square inch to about 135 to about 315 pounds per square inch in order to create on the surface of the individual polymer particle or agglomarate a fused, glassy shell which provides, upon subsequent compounding with a primary plasticizer for polyvinyl chloride to produce a plastisol, a composition having reduced absorptivity of plasticizer as indicated by improved viscosity stability under room temperature ageing conditions. The vinyl chloride homopolymer resins of this invention are characterized by having lower fusion temperature.

By the method of the invention, a small particle size polymer can be obtained. The size of the polymer particles is reduced over methods of the prior art by the incorporation of an additive to the first stage of the bulk polymerization process. Thus, there is incorporated with the monomer or monomers in a first stage polymerization reactor 0.001 percent to 5 percent by weight, based on the monomer or monomers present in the first stage of the vinyl chloride polymerization of an additive to control polymer particle size having an average particle size in the range of about 0.001 to about 50 microns. A suitable additive is fumed silica sold by Degussa under the tradename "Aerosil". The silica can be treated with an agent to render it hydrophobic. Such a treating agent is dichlorodimethylsilane which is used to produce a fumed silica sold under the tradename "Aerosil R-972" by Degussa. The silica used preferably is a fumed silica having an average particle size below $10^{-1}$ microns.

It is contemplated that both organic and inorganic solid particulate matter which is both insoluble in vinyl chloride monomer and solid at temperatures at least up to reaction temperatures can be used in conjunction with monomers disclosed in the invention in a bulk polymerization process to provide a reduction in particle size of the polymers produced. The average particle size of the solid, inert, particulate matter can be in the range of 0.001 micron to about 50 microns with an average particle size range of 0.01 micron to about 15 microns preferred. An example of an organic solid particulate material useful in the process of the invention is emulsion polymerized vinyl chloride having an average particle size of two microns. Examples of inorganic solid particulate materials other than fumed silica useful in the process of the invention are carbonates such as calcium, magnesium, zinc, cadmium, and barium carbonates, aluminum silicates, and talc. When large quantities of solid inert matter can be added to the monomer without adding excessively to the cost or detracting from the physical properties of the polymers obtained, it is possible to use organic or inorganic solid inert particulate matter having an average particle size range up to 50 microns. An operable amount of useful solid inert particulate matter may thus be obtained from materials having greater than the above preferred average particle size.

The surfactants, or surface active agents, used in combination with vinyl chloride monomer or monomers can be of the nonionic, cationic, or anionic type and present in the range of 0.01 percent to 5 percent by weight based upon the monomer or monomers present in the first stage polymerization.

The surface active agents are agents having structurally unsymetrical molecules containing both hydrophilic and hydrophobic moieties. The nonionics do not ionize but may acquire hydrophilic character from an oxygenated side chain, usually polyoxyethylene. The oil-soluble part of the molecule can be aliphatic or aromatic in nature. The cationics ionize so that the oil-soluble portion is positively charged. Principal examples are quaternary ammonium halides such as benzethonium chloride and cetalkonium chloride. The anionics form negatively charged ions contained in the oil-soluble portion of the molecule. The ionizable group is the hydrophilic portion. Examples are sodium salts of organic acids, such as stearic acid and sulfonates or sulfates such as alkylaryl sulfonates, i.e., sulfonates of dodecylbenzene and sulfates of straight chain primary alcohols either fatty alcohols or products of the Oxo process, i.e., sodium lauryl sulfate. Examples of nonionic surfactants that have proven effective are octylphenoxy polyethoxyethanols sold under the tradename "Triton X-100" and "Triton X-35" by the Rohm and Haas Company, Philadelphia, Pennsylvania. Examples of anionic surfactants are as follows: calcium, zinc, magnesium, and nickel stearates. An example of an effective cationic surfactant is a quaternized amine sold under the tradename "Quaternary O" by the Ciba-Geigy Corporatioon.

It is thus an object of the present invention to provide a bulk polymerization process for the production of high molecular weight vinyl chloride polymers or copolymers having small particle size and an exterior shell on the individual particle or agglomerate characterized as being glassy and fused. This shell is believed to be composed of low molecular weight polyvinyl chloride which renders such particles of polyvinyl chloride polymer or copolymer more resistant to solvation at ambient temperature as compared to polymers and copolymers of the prior art.

It is another object of the present invention to provide high molecular weight vinyl chloride polymers or copolymers wherein the absorptivity of the polymer so produced is reduced as compared polymers and copolymers produced by a two stage polymerization process of the prior art. This object is achieved by increasing the temperature and pressure in the second stage of conversion of the monomer or monomers in a bulk polymerization process so as to polymerize a portion of the monomer or monomers in a fused, glassy shell around the already formed polymer particles.

All other conditions and measures of the method of the invention are those conventionally employed in the previously known methods for the bulk polymerization of vinyl chloride involving two stage polymerization as disclosed in British Pat. No. 1,047,489 and U.S. Pat. No. 3,522,227. In the following abbreviated description of the process, for the sake of simplicity, the initial stage of the polymerization or copolymerization will be referred to as first stage reaction and the vessel in which this initial stage of polymerization is carried out will be referred to as a "Prepolymerizer". The final or complementary stage of the polymerization will be called simply second stage reaction and the vessel in which it is carried out the "Polymerizer".

In the first stage reactor, the means chosen to agitate the monomer or monomers is of a type capable of providing high shear and is commonly referred to as a "radial turbine type" agitator. At the start of the first stage reaction, the vessel is charged with a monomer composition to which a catalyst has been added. Any polymerization catalyst generally used in bulk polymerization methods, that is organic peroxides such as dilauroyl peroxide and benzoyl peroxide, organic peroxydicarbonates such as di-2-ethylhexylperoxy-dicarbonate, isopropyl peroxydicarbonate, or other organic radical formers such as azo compounds in which both azo nitrogen atoms are connected with a tertiary carbon atom, the other valences of which are saturated by nitrile, carboxy, alkyl, cycloalkylene, alkyl, or alkyl-OOO radicals, or radiation rich in energy, such as ultra violet light, can, of course, also be used to an extent which is usual for bulk polymerization processes. After addition of the vinyl chloride monomer to the first stage reactor, a small amount of monomer is vented in order to blow the air out of the first stage reactor vessel. The speed of the turbine type agitator generally lies between 500 and 2,000 revolutions per minute or a tip speed of about 2 to about 7 meters per second in the first stage reactor. A tip speed of about 0.5 to about 2 meters per second is used in the second stage reactor. These figures should not be regarded as limiting values. As soon as a conversion of at least about 3 to about 15 percent of the monomer composition has been obtained in the first stage reactor, the contents of the vessel are transferred to a second stage polymerization vessel equipped to provide slow speed, low shear agitation so as to insure proper temperature control of the reaction medium during which a portion of the polymerization is conducted at increased temperature and pressure to render the surface of the polymer particles glassy, and fused. A final monomer conversion of about 85 percent is achieved.

The reaction temperature in both first and second stage reactors generally ranges between about 30° centigrade to about 95° centigrade, preferably about 30° to about 75° centigrade.

The reaction temperature during the part of the second stage reaction during which a portion of the monomer or monomers is polymerized on the surface of the particles in the form of a low molecular weight, glassy, fused, non-porous coating ranges from about 60° centigrade to about 95° centigrade, preferably about 65° to about 75° centigrade.

The reaction pressure in the first stage reactor generally ranges between about 130 pounds per square inch to about 210 pounds per square inch, preferably about 150 to about 190 pounds per square inch. The reaction pressure in the second stage reactor generally ranges between about 80 to about 120 pounds per square inch, preferably between about 90 to about 105 pounds per square inch. The reaction pressure during formation of the low molecular weight, fused, glassy coating on the surface of the particles in the second stage reactor, ranges from about 135 pounds per square inch to about 285 pounds per square inch, preferably between about 150 to about 190 pounds per square inch.

Examples of monomers that can be copolymerized with vinyl chloride are vinylidene chloride and vinyl esters such as vinyl acetate. The proportion of vinyl chloride should amount to at least 80 percent by weight of the monomers employed.

The optical microscope and sieve analysis were used as a method of determining average particle size. A magnification of 155 times was used together with an eye piece having a scale graduated in microns to determine the average particle size directly in microns. A 325 mesh screen having openings of 44 microns was used.

The molecular weight of the polymers presently commercially produced by bulk polymerization ranges from about 40,000 to about 125,000 by the weight average method. The ASTM method 1243 method A (1 percent in cyclohexanone) was also used to determine molecular weight by relative viscosity. The polymers produced varied by this method between 1.6 and 2.7.

In order to further illustrate this invention but without being limited thereto, the following examples are given. In this specification, all parts and percentages are by weight, all pressures are gauge pressures, and all temperatures are in degrees centigrade unless otherwise specified.

EXAMPLE 1

Method of copending application Ser. No. 169,838 filed Aug. 6, 1971.

In a vertical-type first stage reactor of 2½ gallon capacity and stainless steel construction, equipped with a radial turbine type agitator were added 5.2 grams of fumed silica treated with dichlorodimethyl silane, 0.77 milliliters of a 29 percent solution of acetylcyclohexanesulfonyl peroxide in dimethyl phthalate sold under the tradename "Lupersol 228 P" by the Lucidol Division of the Penwalt Company and 2.5 milliliters of a 40 percent solution of di-2, ethylhexyl peroxydicarbonate in mineral spirits sold under the tradename "Lupersol 223 M" by the Lucidol Division of the Penwalt Company. 13.0 pounds of vinyl chloride were added to the reactor at a temperature of 20° centigrade and 1.5 pounds of the vinyl chloride monomer were vented to the atmosphere to remove air from the reactor. The mixture in the reactor was slowly raised in temperature while agitating using the radial turbine type agitator at a speed of 2,000 revolutions per minute to a temperature of 67° centigrade over a period of 1 hour and maintained at this temperature for a period of 15 minutes at a reaction pressure of 167 pounds per square inch.

The mixture was then transferred to a 5 gallon stainless steel reaction vessel containing 3.9 milliliters of "Lupersol 228 P", 6.3 milliters of "Lupersol 223 M" and 7.5 pounds of vinyl chloride. 1.5 pounds of vinyl chloride were vented in order to clear the air from the reactor. The mixture was heated to 50° centigrade and the pressure raised to 105 pounds per square inch. These conditions were maintained over a period of 5 hours. The monomer that has not reacted is blown off and collected in a condensing circuit incorporating a filter so as to separate any particles of polymer carried over. The final traces of residual monomer absorbed by the particles of polymer are eliminated by placing the polymerizer under vacuum twice in succession and changing over to a nitrogen atmosphere in between. All the polymer composition is then passed through screening equipment. In this way, a powdery polymer is obtained in a yield of 83 percent by weight based upon the weight of the monomer available for polymerization. The polymer has an average particle size of 44 microns as indicated by the fact that 50 percent of the polymer particles pass through a 44 micron screen. The weight average molecular weight as determined by gel permeation chromotography was 99,200.

EXAMPLE 2

A bulk polymerized polyvinyl chloride homopolymer was made by the process of this invention using the same proportions of ingredients as in Example 1, but during the last 30 minutes of reaction using an internal temperature of 73°–75° centigrade and a pressure not exceeding 175 pounds per square inch to provide a total reaction time of 5 hours during the second stage polymerization. In this way a powdery polymer is obtained in a yield of 83 percent by weight based on the weight of the monomer available for polymerization. The polymer has an average particle size of 41 microns as determined by microscopic observation using a magnification of 155 power. Molecular weight as determined by gel permeation chromotography was 95,500.

EXAMPLE 3

Using the same proportions of ingredients and conditions as those described in Example 2 above, a bulk polymerized polyvinyl chloride homopolymer was made according to the process of this invention. The total reaction time in the second stage polymerization was 4 hours and 15 minutes at 97 pounds per square inch pressure and the jacket temperature in the second stage reactor is raised to 75° centigrade until the pressure starts to drop off. The jacket temperature is then lowered to 45° centigrade as soon as possible. The time involved was 2¾ hours for the final heating step. In this way, a powdery polymer is obtained in a yield of 80 percent based upon the weight of the monomer available for polymerization. The polymer has an average particle size of 39 microns as determined by microscopic observation using a magnification of 155 power.

EXAMPLE 4

Using the resins prepared in Examples 1, 2 and 3 above, plastisols were made up using the following formulation. Seventy parts of an emulsion polymerized polyvinyl chloride homopolymer sold under the tradename "Geon 121" by B. F. Goodrich Chemical Company, 30 parts of the bulk polymerized polyvinyl chloride resin produced in the Examples above, and 60 parts of dioctylphthalate. The plastisols were prepared in the usual manner by combining the ingredients, blending until uniform using high speed agitation and dearating to remove entrapped air. Viscosity was evaluated using a Brookfield viscometer with the plastisol being maintained at a temperature of 25° centigrade ± 0.3 degrees centigrade. A No. 3 spindle was used and viscosity was determined as shown in the following table after ageing the plastisol 2 hours and after 24 hours.

TABLE

| Plastisols containing Extender Resin prepared in: | Viscosity at 25 ± 0.3 C (cps) at 12 RPM (Brookfield LV Viscometer) | |
|---|---|---|
| | after 2 hours ageing | after 24 hours ageing |
| Example 1 (control) | 5400 | 7100 |
| Example 2 | 4000 | 5200 |
| Example 3 | 3500 | 4900 |

As shown in the above table, the Extender Resin made in Example 1 shows a higher viscosity after 2 hours ageing and after 24 hours ageing than either of the plastisols made using the Extender resin prepared as described in Examples 2 and 3. The resin prepared in Example 1 is representative of the polymer of copending application Ser. No. (Case 3013) filed Aug. 6, 1971 and only Examples 2 and 3 represent the novel product of the invention.

In addition to providing plastisols having lower viscosity, the compositions of the invention have substantially lower fusing temperature. The polymer of Example 1 (control) has a fusing temperature of 68° centigrade as compared to the fusing temperature of 55° centigrade for the polymer of Example 2 and 50° centigrade for the polymer of Example 3.

EXAMPLE 5

An extender grade polyvinyl chloride copolymer resin was made following the procedure of Example 2 and using the proportions of Example 1 except that monomers used were as follows: first stage, 2.8 pounds of vinyl acetate and 11.7 pounds of vinyl chloride, second stage, 1.1 pounds of vinyl acetate and 6.4 pounds of vinyl chloride. A small particle size copolymer was obtained having reduced plasticizer absorption as compared to copolymers of the prior art.

EXAMPLE 6

An extender grade polyvinyl chloride resin was made using the processing equipment of Examplle 1 and proportions and procedures as follows: The first stage reactor was charged with 11.5 pounds of vinyl chloride, 0.77 milliliters of "Lupersol 228 P", 2.5 milliliters of "Lupersol 223 M", and 5 grams of calcium stearate (0.12 based upon monomer). 1.5 pounds of vinyl chloride was vented to remove air from the reactor. The mixture in the reactor was slowly raised in temperature while agitating using the agitator set to run at 2150 revolutions per minute. A temperature of 66.5° centigrade was reached after a period of one hour, and the mixture was maintained at this temperature for 15 minutes at a pressure of 167 pounds per square inch.

The mixture was then transferred to the second stage reactor containing 3.9 milliliters of "Lupersol 228 P", 6.3 milliliters of "Lupersol 223 M", and 7.5 pounds of vinyl chloride. The agitator was then turned on and set to run at 63 revolutions per minute and after 3 minutes, 1.3 pounds of vinyl chloride was vented. The mixture was reacted at 105 pounds per square inch for 45 minutes and then the pressure was raised to 225 pounds per square inch over a 45 minute period after obtaining approximately 20 percent conversion of monomer. The pressure was then held at about 225 pounds per square inch for about 30 minutes. The reaction was continued at 105 pounds per square inch for 1⅛ hours and polymer was recovered in 83 percent conversion having a 49 micron average particle size and a relative viscosity of 2.04. Brookfield viscosity (cps) of a plastisol prepared and tested as in Example 4 was 3,900 after 2 hours ageing and 7200 after 24 hours ageing.

Various changes and modifications can be made in the method and compositions of this invention, certain preferred forms of which have been described herein, without departing from the spirit and scope of this invention; it being the intention that all matter contained in the above description shall be regarded as illustrative and not in a limiting sense.

What is claimed is:

1. A process for preparing vinyl chloride polymer or copolymer particles having a fused, glassy surface which comprises:
    1. polymerizing a monomer or monomers in a first stage at a temperature of about 30° to about 80°C and in contact with at least one of an additive selected from the group consisting of
        A. an inorganic or organic, inert, fine particle size material, solid at least at reaction temperature and insoluble in said monomer or monomers, said material having an average particle size in the range of about 0.001 to about 50 microns and said material being present in the amount of 0.001 to 5 percent based upon said monomer or monomers present in said first stage, and
        B. a surface active agent in an amount of 0.01 to 5 percent by weight based upon the monomer or monomers present in said first stage
    during which the reaction mixture is subjected to high speed agitation until about 3 percent to about 15 percent by weight of said monomer or monomers have been converted to polymer particles, and
    2. continuing the preparation of polymer particles by polymerization in a second stage during which said reaction mixture is subjected to low speed agitation at a temperature of about 30° to about 80° centigrade and completing the reaction by increasing the temperature of the reaction mixture to about 60° to about 95° centigrade, the increase in temperature being in the range of about 10° to about 65° centigrade, so that at least 10 to about 50 percent of monomer or monomers present in said second stage are polymerized to provide on the surface of the polymer particles a low molecular weight, glassy, fused coating of polymer.

2. The process of claim 1 wherein at least 15 to about 35 percent of said monomer or monomers are polymerized in a portion of said second stage polymerization to provide said vinyl chloride polymer or copolymers having a fused, glassy surface.

3. The process of claim 2 wherein said monomers comprise vinyl chloride present in the proportion of at least 80 percent by weight.

4. The process of claim 1 wherein said monomer consists of vinyl chloride.

5. The process of claim 2 wherein said monomers comprise a mixture of 85 percent by weight vinyl chloride and 15 percent by weight of vinyl acetate.

6. The product of the process of claim 1.

7. The product of the process of claim 3.

8. The product of the process of claim 5.

* * * * *